June 10, 1947.　　J. R. WHINNERY　　2,422,058
WAVE GUIDE SYSTEM
Filed Aug. 16, 1943

Inventor:
John R. Whinnery,
by Harry E. Dunham
His Attorney.

Patented June 10, 1947

2,422,058

UNITED STATES PATENT OFFICE 2,422,058

WAVE GUIDE SYSTEM

John R. Whinnery, Schenectady, N. Y., assignor to General Electric Company, a corporation of New York Application August 16, 1943, Serial No. 498,778

9 Claims. (Cl. 178—44)

My invention relates to ultra high frequency systems and more particularly to the transmission of ultra high frequency energy.

Energy may be transmitted dielectrically through wave guides of the hollow-pipe type when the frequency at which the guide is excited is greater than a critical or cut-off frequency, the energy being transmitted through the dielectric of the medium within the guide and conductive or metallic defining members or walls of the guide serving to direct the propagation of the electromagnetic waves.

It is an object of my invention to provide a new and improved wave guide for use in the transmission of ultra high frequency energy.

It is another object of my invention to provide a new and improved wave guide structure which permits the transmission of high frequency electromagnetic waves of the longer wave lengths without a corresponding increase in the physical dimensions of the guide.

It is another object of my invention to provide a new and improved wave guide having a very small cross-section compared to the length of the electromagnetic waves propagated therethrough.

It is a further object of my invention to provide a new and improved wave guide whose cut-off frequency varies sharply with small changes in dimension of one portion of the guide.

It is a still further object of my invention to provide a new and improved wave guide having a cut-off frequency varying critically with slight varations of the dielectric constant of a portion thereof.

Still another object of my invention is to provide a new and improved wave guide whose cut-off frequency may be selectively adjusted over a wide range to control the transmission of electromagnetic energy therethrough.

It is a still further object of my invention to provide a high pass filter of the wave guide type for use at relatively low frequencies.

One of the features of my invention is the provision in a wave guide of the hollow-pipe type of a pair of metallic members extending longitudinally within the guide and projecting from opposite walls of the guide in such a manner that a small centrally located gap is formed therebetween, whose effect is to lower substantially the cut-off frequency of the wave guides. Since the cut-off frequency of a wave guide is the frequency of resonance of the guide cross section to waves propagating only in the transverse plane, the transverse dimensions of a wave guide constructed as shown in the illustrated embodiments of my invention are greatly foreshortened over those of the usual wave guide.

Figure 1:
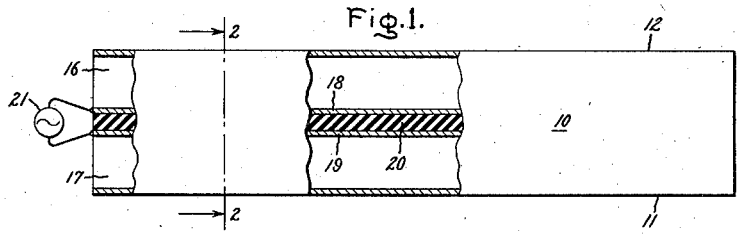
Figure 2:
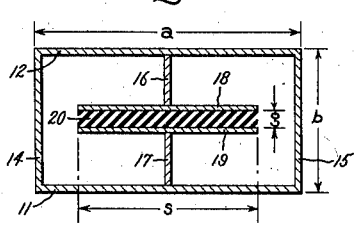
Figure 3:
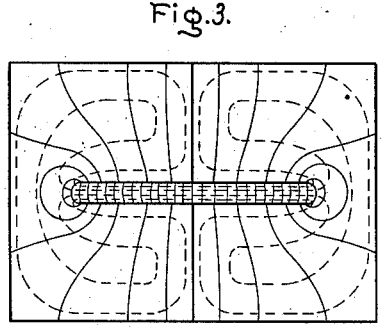
Figure 4:
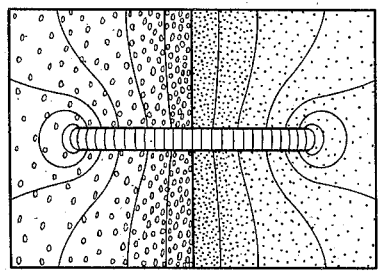
Figure 5:
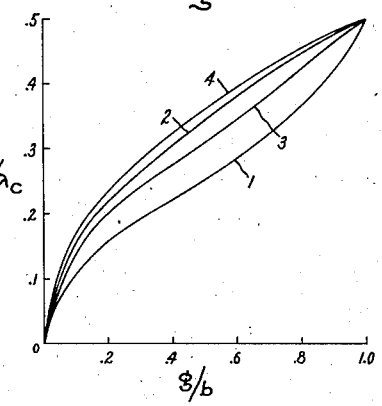
Figure 6:
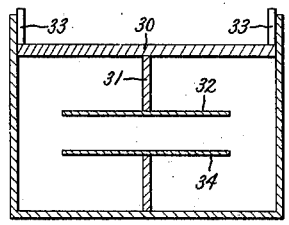
Figure 7:
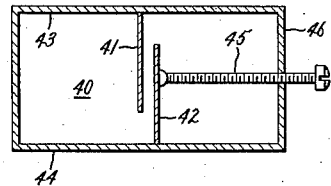

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 diagrammatically illustrates an embodiment of my invention as applied to a metallic wave guide; Fig. 2 is a cross-sectional view of the wave guide of Fig. 1 taken along the lines 2—2; and Figs. 3 and 4 illustrate certain general configurations of the electric and magnetic fields within the wave guide. Fig. 5 shows groups of curves which illustrate the manner in which the cut-off frequency of the wave guide of Fig. 1 may be varied in accordance with my invention; Fig. 6 is a modification of the invention shown in Fig. 1; and Fig. 7 diagrammatically shows another modification of my invention.

Referring to Figs. 1 and 2, jointly, I have there illustrated my invention as applied to a hollow-pipe type of wave guide wherein electric waves are transmitted or propagated dielectrically. It is appreciated that the transverse dimensions of the hollow pipe may be of a variety of configurations, and for the purpose of illustrating my invention, I have chosen to represent a pipe having a substantially rectangular cross-sectional perimeter. The guide 10 may comprise metallic enclosing walls constructed of a metallic medium, such as copper or brass, and may include a base plate 11, a top wall 12, and side walls 14 and 15, all of which are conductively connected. In a rectangular wave guide of this type as normally used, the dimensions $a$ and $b$, the depth and height of the guide, the dielectric constant of the medium within the guide and the path of the wave being propagated determine principally the critical frequency of the guide. The dielectric medium through which the electric wave is transmitted may be considered as being air or a suitable gas, although the waves may be satisfactorily transmitted through an evacuated medium, a liquid, or a solid dielectric.

It is appreciated that, in pipes for dielectrically guiding waves, each boundary of the pipes establishes a critical mean frequency below which energy is not propagated through the guide. In other words, for frequencies below this critical frequency, the wave is rapidly attenuated so that energy cannot be transmitted through the guide.

Above the critical frequency, the wave is propagated in the desired direction and the wave assumes a time space distribution through the guide, established principally by the wave length of the excited impulses for the guide and the transverse dimensions of the guide. In general, in a rectangular wave guide filled with air and having sides whose dimensions are $a$ and $b$, where $a$ is larger than $b$, the length of the longest electromagnetic wave of the transverse electric type, which may be propagated through this guide is substantially equal to $2a$. This wave length $\lambda_c$ corresponds to the cut-off frequency of the guide.

In order to provide means for increasing the wave length of the electromagnetic wave which may be propagated along the wave guide without increasing the cross-sectional perimeter of the guide, a pair of substantially coplanar metallic plates 16, 17 are transversely connected, respectively, to the top wall 12 and the bottom plate 11, substantially at the mid points of these walls, and extend longitudinally within the guide. Each of the metallic members 16, 17 has a metal plate 18, 19 transversely connected across its end remote from its associated wall of the wave guide, which metallic plates are in closely spaced relation and extend a substantial, or major portion of the, distance across the wave guide between the side walls 14, 15. By the construction of the T-shaped members outlined, the wave guide 10 is divided into a plurality of compartments by means of the leg-members 16, 17 the head or cross-members 18, 19 forming a narrow passageway connecting these compartments. This passageway may be filled with the same dielectric medium which fills the wave guide 10 or with any other suitable dielectric material 20, such as mica, for example.

I also provide means for establishing, within the interior of the wave guide, electromagnetic waves. The excitation of the guide may be effected in a variety of ways, as is appreciated by those skilled in the art, and I have chosen to illustrate this means merely as comprising a source 21 of ultra high frequency oscillations connected respectively between the longitudinally extending metallic plates 18, 19. In general, for the most effective excitation of the guide, it is desired to make these connections at the points which will establish the greatest field gradient.

Referring now to Fig. 3, I have shown the general configuration of the distribution of lines of electric and magnetic intensity within the wave guide 10 when the frequency of the transverse electric wave being propagated along the wave guide in very far above the cut-off frequency of the guide, the lines of electric field being conventionally represented by solid lines and the lines of magnetic field being represented by dashed lines. At such frequency, the lines of electric field are entirely transverse and the lines of magnetic field are essentially transverse, the longitudinal components of the lines of magnetic field approaching zero value.

In Fig. 4, I have shown the general configuration of the distribution of lines of electric and magnetic intensity within the wave guide 10 at the cut-off frequency of the transverse electric waves within the guide, the lines of electric field being conventionally represented by solid lines, the lines of magnetic field approaching the observer along the wave guide being represented by dots, and the lines of magnetic field leaving the observer or entering the wave guide being represented by small circles. Under these conditions, of course, the lines of electric field remain entirely transverse, while the lines of magnetic field are essentially longitudinal. The lines of magnetic field are highly concentrated adjacent the transverse plates 16, 17 and approach zero near the side walls of the guide and the center of the gap between plates 18, 19.

From the pattern as illustrated, it is evident that, since the length of the metallic path presented to transversely propagating electromagnetic waves in the guide is substantially increased due to the introduction of the metallic members 16—19, the paths of the electric and magnetic waves in traveling between the side walls 14, 15 are greatly increased. At the same time, due primarily to the concentration of the lines of electric field between the metallic plates 18, 19, the effective electrical length of the paths between the side walls is greatly increased in an amount disproportionate to the increase in the physical length of the paths of the electric and magnetic waves traveling between the side walls 14 and 15. As a result, the transverse dimensions of the guide for a given cut-off frequency, in effect, are greatly foreshortened over those of a normal guide. This foreshortening of the wave guide may be compared directly to the well known foreshortening of a transmission line by the introduction of a lumped capacitance across the line, since the cut-off frequency of a wave guide is the frequency of resonance of the guide's cross-section to waves propagated only in the transverse plane. Thus, substantially increasing the effective electrical length of the path between the walls 14, 15 results in a substantial reduction in the cut-off frequency of the wave guide.

In Fig. 5, I have shown how the wave length of the longest wave which may be propagated through a guide constructed as shown in Figs. 1 and 2 varies with the distance between the plates 18 and 19 extending longitudinally along the interior of the guide and with the size of these plates. For a particular curve, the values of $a$ and $b$ were held to fixed values and the ratio $g/b$ as abscissa is plotted against the ratio $a/\lambda_c$ as ordinate. In this figure, curve 1 shows the variation of the cut-off frequency with the gap $g$ for a guide in which the ratio of the smaller side $b$ to the larger side $a$ of the wave guide was 3:4, while a similar ratio was maintained between the width $s$ of the plates 18, 19 and the width $a$ of the longer side 12. A similar ratio of the sides of the rectangular guides was maintained for the curve 2, but the ratio of the widths of plates 18 and 19 to the width $a$ was reduced to a value of 1:4. In the curves 3 and 4, the ratio of the dimension $b$ to the dimension $a$ was increased to 1:2, while the ratio of the dimension $s$ to the dimension $a$ was held at 1:2 for the curve 3, and 1:4 for curve 4. Of course, in all of these curves, the value of $$\frac{a}{\lambda_c}$$

when the gap $g$ was made equal to the dimension $b$, was equal to .5 which corresponds to the cut-off frequency of the wave guide 10 when none of the metallic members 16—19 are present.

By way of representative dimensions of a wave guide construction, the following values of guide dimensions are given to illustrate the variation in cut-off wave length with the variations of the parameter $g$. For a wave guide having dimension $a$ equal to 5 centimeters and dimension $b$ equal to 4 centimeters and in which the dimension $s$ of the plates 18 and 19 was equal to 4 centimeters, when the distance $g$ between the plates 18, 19 was equal to 2 millimeters, the value of $\lambda_c$ was found to be 67 centimeters. In contrast, when the metallic members 16—19 were not present in this wave guide, the value of $\lambda_c$ was found to be 10 centimeters. For the conventional wave guide without the members 16—19, increasing dimension $a$ by one millimeter results in increasing $\lambda_c$ to 10.2 centimeters, whereas in the construction shown in Fig. 2, decreasing the air gap $g$ by one millimeter resulted in increasing the value of $\lambda_c$ from 67 centimeters to 92 centimeters. It is thus seen that a very small change in the critical dimension of the wave guides for the two conditions, when the members 16—19 are present and when they are not present, results in entirely disproportionate changes in the value of $\lambda_c$, the wave length corresponding to cut-off frequency for the guide.

It has been found further that in a guide constructed as shown in Fig. 2 with the values given in the preceding paragraph, when mica is placed between the plates 18 and 19, the value of $g$ being 2 millimeters, the length of a wave at the cut-off frequency is equal to 115 centimeters. It is thus apparent that a guide of this characteristic is particularly useful in systems operating at relatively low frequencies and in which it is desired to use the special characteristics of wave guides, such as possession of a cut-off frequency. In the conventional type of wave guide, in which the metallic members 16—19 are not employed, the external dimensions of the guide at frequencies where the length of the wave is of the order of 100 centimeters are of unreasonably large size. However, when the guide is constructed in accordance with my invention as is pointed out previously, a relatively small guide may be employed. Furthermore, by using mica or other suitable dielectric, such as titanium dioxide, to fill the gap between plates 18 and 19, wave guides of very small dimensions may be employed to transmit electromagnetic waves of very long wave length and relatively low frequency. Such a wave guide is particularly useful as a high pass filter for circuits employing waves falling outside the ultra high frequency range.

In Fig. 6, I have illustrated a modification of my invention wherein the top wall 30 of the wave guide, which supports the transverse metallic member 31 and the longitudinally extending metallic plate 32, is provided with a plurality of spring fingers 33 along its edges. The wave guide is open at its upper end and the position of the wall 30 is adjustable within the guide so that the gap between plates 32, 34 may be adjusted to a desired value, uniform throughout the length of the guide. By such a construction, as the spacing between the plates 32, 34 is varied, the cut-off frequency of the guide may be adjusted over a substantial range of frequencies.

In Fig. 7, I have shown another modification of a wave guide structure wherein the wave guide 40 is divided into a plurality of compartments by means of a pair of transverse and substantially parallel plates 41, 42, the transverse plate 41 being connected substantially at the mid point of the upper wall 43 and plate 42 being connected substantially at the mid point of plate 44. The plates 41 ad 42 are spaced apart and are of sufficient length that they overlap a major portion of the distance between walls 43, 44 to form a narrow passageway connecting the aforesaid compartments. The plate 42 has pivotally attached thereto a threaded screw 45 of any suitable rigid insulating material. The screw 45 engages cooperating threads in the side wall 46 of the guide 40 and functions as means whereby the spacing of the plate 42 with respect to the plate 41 may be varied over a limited range of values, the range being selected to meet requirements of a particular circuit in which the wave guide may be employed, whether for transmitting electromagnetic waves of relatively long wave length or to operate as a high pass filter in a given circuit.

From the foregoing, it may be seen that my invention provides a wave guide of reasonable dimensions in which electromagnetic waves of relatively low values may be propagated.

While I have shown and described my invention as applied to particular systems embodying the various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. The combination in a wave guide of the metallic hollow-pipe type, of a pair of parallel metallic plates extending longitudinally of said guide, said plates having transverse members conductively connected respectively to opposite points of the inner wall of said guide to divide said wave guide into a plurality of compartments, and said plates being in spaced relation a substantial distance across said wave guide to form a narrow passageway connecting said compartments, whereby the effective electrical length of the metallic path presented to transversely propagating electromagnetic waves in said guide is substantially increased and the cut-off frequency of said guide is substantially reduced.

2. In combination, a wave guide of the rectangular metallic pipe type, a pair of longitudinal and substantially coplanar metallic members extending from opposite inner walls of said wave guide to divide said wave guide into a pair of compartments having substantially equal cross-sections, each of said metallic members having a metal plate transversely connected across its end remote from its associated wall, said metal plates being in closely spaced relation to form a narrow passageway connecting said compartments, whereby the effective electrical length of the path presented to transversely propagating waves in said guide is substantially increased and the cut-off frequency of said wave guide is substantially reduced.

3. The combination, in a wave guide of the metallic hollow-pipe type, of a pair of parallel metallic plates extending longitudinally of said guide, said plates being conductively connected respectively to opposite inner walls of said guide to divide said wave guide into a plurality of compartments, said plates being in spaced relation a substantial distance across said wave guide to form a narrow passageway connecting said compartments, whereby the effective electrical length of the path presented to transversely propagating electromagnetic waves in said guide is substantially increased and the cut-off frequency of said guide is substantially reduced, and means for varying the spacing of said plates to vary the cut-off frequency of said guide.

4. In combination, a wave guide of the rectangular metallic pipe type, a pair of T-shaped metallic members extending longitudinally along said guide, said T-members having their leg members conductively connected to the mid points of the inner surfaces of opposite walls of said guide and their cross-members in spaced relation to define a narrow passageway extending over a major portion of the cross-section of said guide.

5. In a wave guide system of the rectangular metallic pipe type, means for varying the cut-off frequency of said guide over a substantial range, said means comprising a pair of metallic plates extending longitudinally along said guide, said plates being connected respectively to opposite inner walls of said guide substantially at the mid points thereof to divide said guide into a plurality of compartments and being in spaced relation over a major portion of their cross-sectional area to define a narrow passageway connecting said compartments, whereby the effective electrical length of the path presented to transversely propagating electromagnetic waves in said guide is substantially greater than the perimeter of said guide and the cut-off frequency of said guide is substantially reduced, and means for varying the gap between said plates to vary said length.

6. A high pass filter for electromagnetic waves comprising a rectangular wave guide defined by metallic wall members and a pair of T-shaped metallic members longitudinally disposed within said guide, the legs of said T-members being connected to opposite walls of said guide substantially at their mid points to divide said guide into a plurality of compartments, and the cross-portions of said T-members being in spaced relation to define a passageway connecting said compartments.

7. A high pass filter for electromagnetic waves comprising a rectangular wave guide defined by metallic wall members, a pair of T-shaped metallic members longitudinally disposed within said guide, the legs of said T-members being connected to opposite walls of said guide substantially at their mid points to divide said guide into a plurality of compartments, and the cross-portions of said T-members being in spaced relation to define a passageway connecting said compartments, and means for varying the distance between said cross-portions of said T-members to adjust the cut-off frequency of said filter to a desired value.

8. A high pass filter for electromagnetic waves comprising a rectangular wave guide defined by metallic wall members, a pair of T-shaped metallic members longitudinally disposed within said guide, the legs of said T-members being connected to opposite walls of said guide substantially at their mid points to divide said guide into a plurality of compartments, and the cross-portions of said T-members being in spaced relation to define a passageway connecting said compartments, and a material having a high dielectric constant disposed in said cross-portions of said T-members.

9. The combination, in a wave guide of the metallic hollow-pipe type, of a pair of parallel metallic plates extending longitudinally of said guide, said plates being conductively connected respectively to opposite inner walls of said guide to divide said wave guide into a plurality of compartments, said plates being in spaced relation a substantial distance across said wave guide to form a narrow passageway connecting said compartments, and a material having a high dielectric constant disposed between said plates substantially throughout said distance, whereby the effective electrical length along said opposite walls is substantially increased and the cut-off frequency of said wave guide is substantially reduced.

JOHN R. WHINNERY.

REFERENCES CITED

The following references are of record in the file of this patent:

UNITED STATES PATENTS

| Number | Name | Date |
|---|---|---|
| 2,317,503 | Usselman | Apr. 27, 1943 |
| 2,197,123 | King | Apr. 16, 1940 |